US012559257B2

(12) United States Patent     (10) Patent No.:   US 12,559,257 B2

Duraisamy          (45) Date of Patent:     Feb. 24, 2026

(54) SYSTEMS AND METHODS FOR COORDINATING MAINTENANCE OPERATIONS FOR AIRCRAFT

(71) Applicant: THE BOEING COMPANY, Chicago, IL (US)

(72) Inventor: Chitra Duraisamy, Richmond (CA)

(73) Assignee: The Boeing Company, Arlington, VA (US)

( * ) Notice: Subject to any disclaimer, the term of this patent is extended or adjusted under 35 U.S.C. 154(b) by 542 days.

(21) Appl. No.: 17/986,943

(22) Filed: Nov. 15, 2022

(65) Prior Publication Data

US 2024/0158101 A1     May 16, 2024

(51) Int. Cl.
    B64F 5/60        (2017.01)
    G07C 5/00       (2006.01)
    G07C 5/08       (2006.01)

(52) U.S. Cl.
    CPC ................ B64F 5/60 (2017.01); G07C 5/006 (2013.01); G07C 5/0808 (2013.01); G07C 5/0825 (2013.01); *G07C 2205/02* (2013.01)

(58) Field of Classification Search
    CPC ......... B64F 5/60; G07C 5/006; G07C 5/0808; G07C 5/0825; G07C 2205/02
    See application file for complete search history.

(56) References Cited

U.S. PATENT DOCUMENTS

| | | | | |
|---|---|---|---|---|
| 6,816,762 | B2 * | 11/2004 | Hensey | ............... H04L 63/0853 |
| | | | | 701/33.4 |
| 2009/0306935 | A1 * | 12/2009 | Hamilton | ................ A63F 13/65 |
| | | | | 715/705 |
| 2012/0146815 | A1 * | 6/2012 | Yourkowski | ........... G06Q 50/40 |
| | | | | 340/945 |
| 2014/0282684 | A1 * | 9/2014 | Keen | ........................ H04N 7/18 |
| | | | | 725/30 |
| 2018/0322714 | A1 * | 11/2018 | Gennotte | ............. G07C 5/0808 |
| 2020/0156807 | A1 * | 5/2020 | King | ........................ B64F 1/305 |

OTHER PUBLICATIONS

Lynne E. Parker et al. "Robotics Applications in Maintenance and Repair" (1998), Industrial Robotics, 2nd Edition (Year: 1998).*

* cited by examiner

*Primary Examiner* — Gertrude Arthur Jeanglaude
(74) *Attorney, Agent, or Firm* — Joseph M. Butscher; Carroll, Hoette & Butscher, LLC

(57)            ABSTRACT

A system and a method include a scanner configured to scan one or more codes associated with an aircraft. A user interface includes a display. A maintenance control unit is configured to receive scanned data regarding the one or more codes from the scanner, and show one or more maintenance operations for the aircraft on the display in response to receiving the scanned data.

20 Claims, 4 Drawing Sheets

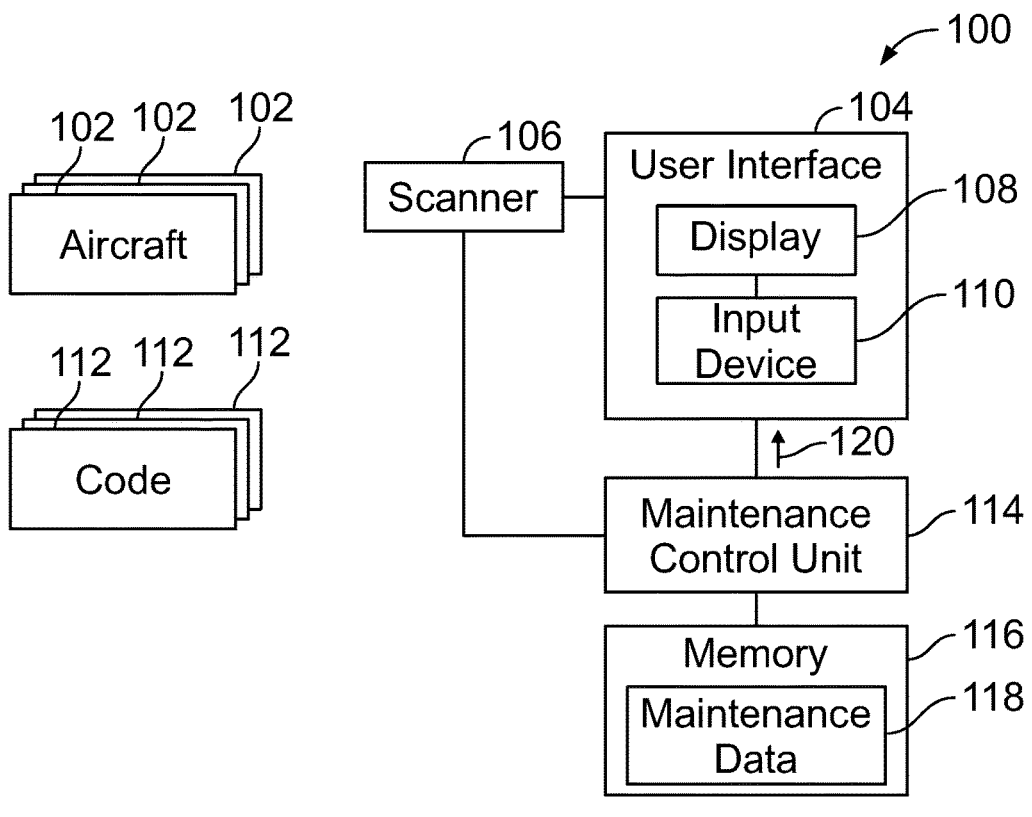
FIG. 1
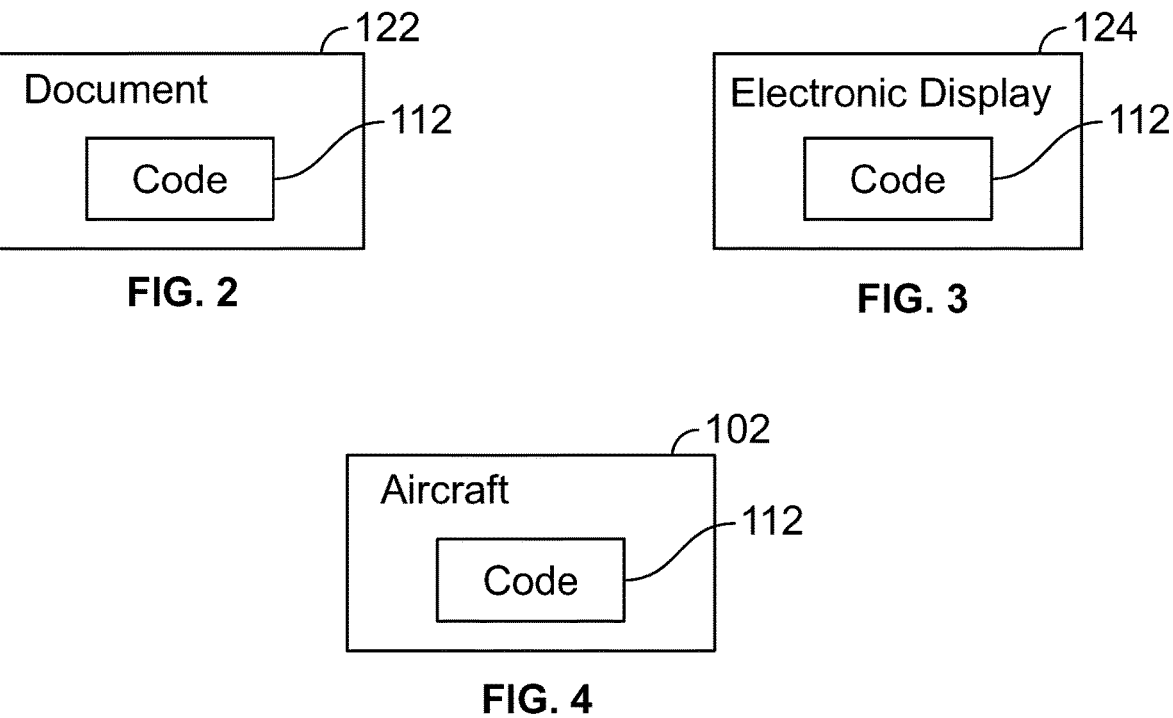
FIG. 2
FIG. 3
FIG. 4

Scan one or more
codes associated with
a specific aircraft
and one or more
maintenance operations
associated with the
aircraft — 200

Receive scanned data — 202

Retrieve the maintenance
operations for the aircraft — 204

Show the maintenance
operations on a display — 206

D633AM103-AAL - 49-00-00-810-816X

— 112

SYSTEMS AND METHODS FOR COORDINATING MAINTENANCE OPERATIONS FOR AIRCRAFT

FIELD OF THE DISCLOSURE

Examples of the present disclosure generally relate to systems and methods for coordinating maintenance operations for aircraft.

BACKGROUND OF THE DISCLOSURE

Aircraft are used to transport passengers and cargo between various locations. Numerous aircraft depart from and arrive at a typical airport every day.

Aircraft require periodic maintenance in relation to various systems, components, areas, and the like. After each flight of an aircraft, certain maintenance operations are performed with respect to certain aspects of the aircraft. As another example, certain maintenance operations are performed after a certain number of flights, certain hours of flight, and the like.

Maintenance crews at an airport perform the various maintenance operations for aircraft. Typically, a member of a maintenance crew manually enters identification information regarding an aircraft to gain access to maintenance records for the aircraft. In particular, the individual manually types in information that identifies the aircraft into a system. For example, the individual typically interacts with a device to manually select an aircraft, and types in a required location, fault code, and/or part number to perform a maintenance operation. However, typing in information into a device may lead to data entry errors, which can lead to delays in the aircraft returning to flight.

SUMMARY OF THE DISCLOSURE

A need exists for a system and a method for improving coordination of maintenance operations for an aircraft. Further, a need exists for a system and a method for reducing human error in relation to coordination of maintenance operations of an aircraft.

With those needs in mind, certain examples of the present disclosure provide a system including a scanner configured to scan one or more codes associated with an aircraft. A user interface includes a display. A maintenance control unit is configured to receive scanned data regarding the one or more codes from the scanner, and show one or more maintenance operations for the aircraft on the display in response to receiving the scanned data.

In at least one example, the user interface further comprises the scanner.

In at least one example, the one or more codes are one or more Quick Response (QR) codes.

The maintenance control unit can be further configured to automatically perform one or more maintenance operation in relation to the aircraft based on the scanned data.

In at least one example, the one or more codes are printed on a document, shown on the display or another electronic display, and/or disposed on a portion of the aircraft.

In at least one example, the maintenance control unit is an artificial intelligence or machine learning system.

Certain examples of the present disclosure provide a method including scanning, by a scanner, one or more codes associated with an aircraft; receiving, by a maintenance control unit, scanned data regarding the one or more codes from the scanner; and showing, by the maintenance control unit, one or more maintenance operations for the aircraft on a display of a user interface in response to said receiving.

Certain examples of the present disclosure provide a non-transitory computer-readable storage medium comprising executable instructions that, in response to execution, cause one or more control units comprising a processor, to perform operations comprising: receiving, by a maintenance control unit, scanned data regarding one or more codes associated with an aircraft from a scanner; and showing, by the maintenance control unit, one or more maintenance operations for the aircraft on a display of a user interface in response to said receiving.

BRIEF DESCRIPTION OF THE DRAWINGS

FIG. 1 illustrates a schematic block diagram of a system for coordinating maintenance for one or more aircraft, according to an example of the present disclosure.

FIG. 2 illustrates a simplified block diagram of a code on a document, according to example of the present disclosure.

FIG. 3 illustrates a simplified block diagram of a code on an electronic display, according to an example of the present disclosure.

FIG. 4 illustrates a simplified block diagram of a code on an aircraft, according to an example of the present disclosure.

DETAILED DESCRIPTION OF THE DISCLOSURE

Figure 5:
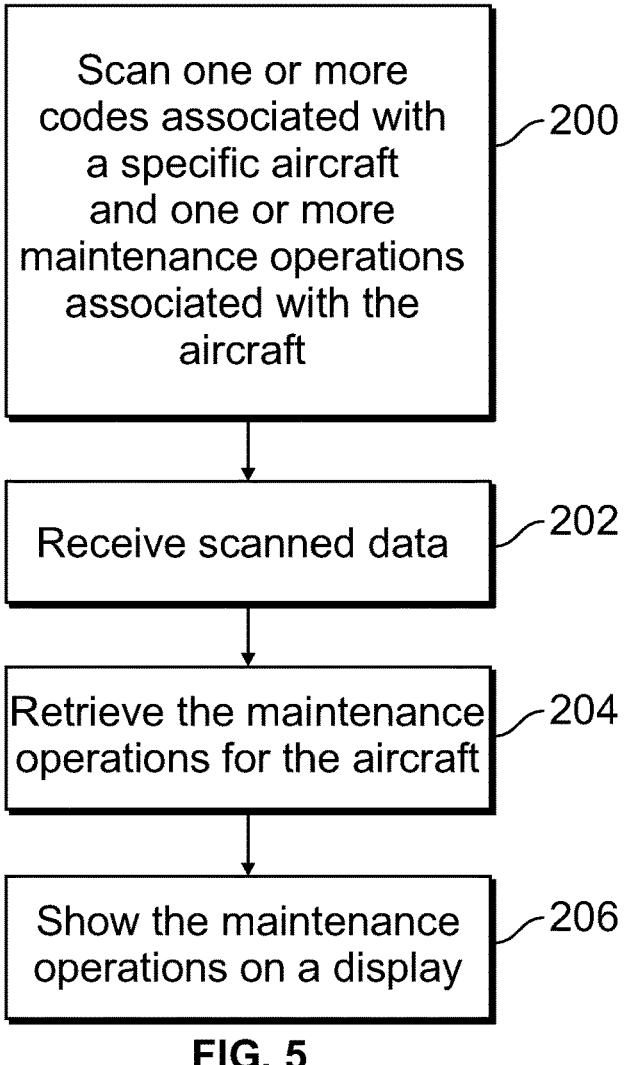
FIG. 5 illustrates a flow chart of a method, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods that eliminate, minimize, or otherwise reduce the hassle of manually entering data with respect to aircraft maintenance operations. In at least one example, the systems and methods include a code that is used for performing maintenance tasks. In response to the code being scanned, maintenance procedures are shown on a display. In at least one example, a list of codes for maintenance procedures can be used.

Examples of the present disclosure provide simple and effective solutions which eliminate, minimize, or otherwise reduce the chances of manual errors while troubleshooting maintenance problems in the aircraft. Instead of manually selecting the correct aircraft and the appropriate manual from the list, an individual can just scan the code, such as from a document, and launch the maintenance procedure with just a click that reduces the time of selecting aircraft and searching for a procedure. Notably, the manual process of picking the right task from a list of hundreds of procedures takes approximately 30 seconds, but examples of the present disclosure reduce such time to less than 5 seconds, thereby reducing labor time, and down time for the aircraft. In general, examples of the present disclosure provide an automated solution that expedites maintenance and addresses the challenges of manual entry during maintenance activities.

FIG. 1 illustrates a schematic block diagram of a system 100 for coordinating maintenance for one or more aircraft 102, according to an example of the present disclosure. The system 100 includes a user interface 104 in communication with a scanner 106 through one or more wired or wireless connections. The user interface 104 includes a display 108 and an input device 110. The display 108 can be an electronic monitor, electronic screen, television, touchscreen, and/or the like. The input device 110 can include a keyboard, mouse, stylus, touchscreen interface (that is, the input device 110 can be integral with the display 108), and/or the like.

In at least one example, the user interface 104 is a handheld electronic device. For example, the user interface 104 can be a specialized handheld device used by members of a maintenance crew. The user interface 104 can be a handheld smart device, such as a smart phone, tablet, and/or the like. In at least one other example, the user interface 104 can be a computer workstation, such as a dedicated maintenance operations computer workstation.

The scanner 106 is configured to scan one or more codes 112 associated with the aircraft 102. Each aircraft 102 is associated with a code 112 specific to the aircraft 102. In at least one example, each aircraft 102 can be associated with numerous codes 112, each of which specifically identities the associated aircraft 102 and one or more maintenance operations for the aircraft 102. In at least one example, the code(s) 112 for one or more maintenance procedures can be generated by an individual interacting with the user interface 104, such as via an application. Such code(s) 112 can later be scanned by the scanner 106 so that the individual can then view the particular maintenance procedures on the display 108.

The scanner 106 can be an optical device, such as a camera, infrared scanner, laser scanner and/or the like that is configured to scan the one or more codes 112. In at least one example, the scanner 106 is part of the user interface 104. That is, the user interface 104 includes the scanner 106. For example, a handheld device can include the display 108, the input device 110, and the scanner 106. In at least one other example, the scanner 106 can be separate, distinct, and remote from the user interface 104.

A maintenance control unit 114 is in communication with the user interface 104 and the scanner 106, such as through one or more wired or wireless connections. In at least one example, the maintenance control unit 114 is separate and distinct from the user interface 104 and the scanner 106, and is in communication therewith through wireless communication interfaces, such as private or public communication networks, one or more antennas or transceivers, WiFi, Bluetooth, and/or the like. In at least one other example, the user interface 104 includes the maintenance control unit 114. In at least one other example, the scanner 106 includes the maintenance control unit 114. In at least one example, the maintenance control unit 114 can include (or otherwise be) an electronic application, such as a mobile library and/or toolbox application.

The maintenance control unit 114 is also in communication with a memory 116, such as through one or more wired or wireless connections. The maintenance control unit 114 and the memory 116 can be co-located. In at least one example, the maintenance control unit 114 includes the memory 116. In at least one other example, the maintenance control unit 114 is separate and distinct from the memory 116, which can be remotely located from the maintenance control unit 114.

The memory 116 stores maintenance data 118 regarding the aircraft 102. The maintenance data 118 includes various maintenance operations to be performed in relation to the aircraft 102. The maintenance data 118 includes routine maintenance procedures for the aircraft 102, as well as maintenance procedures to be formed in response to a fault being detected.

The code(s) 112 are associated with the aircraft 102. For example, the code(s) 112 identify the aircraft 102, such as via a specific identifier unique to the aircraft 102. In at least one example, the code(s) 112 is a bar code. In at least one further example, the code(s) 112 is a Quick Response (QR) code. The code(s) 112 can also be associated with one or more maintenance operations that are to be performed in relation to the aircraft 102.

In operation, a user scans the one or more codes 112 with the scanner 106. In response, the scanner 106 outputs a scanned signal including the data from the one or more codes 112 to the maintenance control unit 114. In response to receiving the scanned signal from the scanner 106, the maintenance control unit 114 retrieves the data associated with the code(s) 112, as received from the scanner 106, from the memory 116. In at least one example, the maintenance control unit 114 identifies the aircraft 102 from the identification information contained with the code(s) 112, and retrieves the maintenance data 118 associated with the aircraft 102. The maintenance data 118 associated with the aircraft 102 includes one or more maintenance operations that are to be performed in relation to the aircraft 102 before a subsequent flight of the aircraft 102. The maintenance control unit 114 then outputs a maintenance operation signal 120 that includes data regarding the maintenance operations that are to be performed to the user interface 104. The data is then shown on the display 108. As such, an individual can then view the data as a list of the maintenance operations to be performed. The individual can then perform the maintenance operations, as shown in the display 108.

In at least one example, in response to receiving the scanned data regarding the one more codes 112 that identify the aircraft 102, the user interface 104 outputs the maintenance operation signal 120 that includes one or more codes 112 associated with the aircraft 102 and including data regarding one or more maintenance operations to the user interface 104. The data can include a list of various maintenance operations. The individual can then scan the code(s) 112 with the scanner 106 to view the list of maintenance operations. Thus, the maintenance control unit 114 can output the maintenance operation signal 120 that includes data regarding the maintenance operations that can be shown on the display 108, and/or one or more codes 112 that can be scanned to view the maintenance operations.

As such, the individual need not manually input any identifying data regarding the aircraft 102 into the user interface 104. Instead, the individual scans the one or more code(s) 112 with the scanner 106, and the maintenance control unit 114 automatically identifies the aircraft 102 from the scanned data, and automatically determines the necessary maintenance operations from the maintenance data 118 associated with the aircraft 102.

In at least one example, the maintenance control unit 114 can automatically perform one or more maintenance operations in relation to the aircraft 102 based on the scanned data received from the scanner 106. For example, the maintenance control unit 114 can automatically update certain system software for the aircraft 102 based on the received scanned data. As another example, the maintenance control unit 114 can automatically operate certain vehicles, devices, or the like that are configured to service the aircraft 102. For example, the maintenance control unit 114 can automatically operate one or more maintenance robots, vehicles, or the like that are configured to refuel the aircraft 102, remove waste from lavatories of the aircraft 102, check fluid pressures of components (such as landing gear), and/or the like. Optionally, the maintenance control unit 114 does not automatically perform maintenance operations.

As described herein, the system 100 allows an individual (such as a member of a maintenance crew or engineer) to view maintenance procedures for the aircraft 102 within a short time, such as within 1-2 seconds. The maintenance control unit 114 provides access (such as online access) to intelligent documents and visual navigation tools for individuals. The maintenance data 118, which can be shown on the display 108, can include maintenance manuals to be viewed by an individual.

In at least one example, when an individual engages the user interface to select a maintenance task for the aircraft 102, a code 112, such as a QR code, listing the details of the maintenance task is shown on the display 108. The individual can add codes 112 for various tasks and can print out such codes, via a printer in communication with the user interface 104.

In at least one example, each of the codes 112 is constructed with a Uniform Resource Locator (URL) that supports a protocol defined by a maintenance application. Each code 112 can be a QR code that includes aircraft identification information, and/or one or more maintenance task details and information.

As described herein, the system 100 includes the scanner 106 configured to scan one or more codes 112 associated with an aircraft 102. The user interface 104 includes the display 108. The maintenance control unit 114 is configured to receive scanned data regarding the one or more codes 112 from the scanner 106, and show one or more maintenance operations for the aircraft 102 on the display 108 in response to receiving the scanned data.

FIG. 2 illustrates a simplified block diagram of a code 112 on a document 122, according to example of the present disclosure. The code 112, such as a QR code that identifies a specific aircraft and/or one or more maintenance operations to be performed in relation to the specific aircraft, can be printed on a document, such as piece of paper.

FIG. 3 illustrates a simplified block diagram of a code 112 on an electronic display, according to an example of the present disclosure. The code 112, such as a QR code that identifies a specific aircraft and/or one or more maintenance operations to be performed in relation to the specific aircraft, can be shown on the electronic display 124, such as the display 108 and/or another electronic display.

FIG. 4 illustrates a simplified block diagram of a code 112 on an aircraft 102, according to an example of the present disclosure. The code 112, such a QR code that identifies a specific aircraft and/or one or more maintenance operations to be performed in relation to the specific aircraft, can physically disposed (such as printed, painted, etched, or the like) directly on a portion of the aircraft 102 itself, such as a portion of a fuselage (such as proximate to or on a door), a portion of a wing, a portion of a nose, and/or the like.

FIG. 5 illustrates a flow chart of a method, according to an example of the present disclosure. Referring to FIGS. 1-5, at 200, the one or more codes 112 are scanned with the scanner 106. The one or more codes 112 are associated with a specific aircraft 102 and/or one or more maintenance operations associated with the aircraft 102. At 202, the maintenance control unit 114 receives the scanned data from the scanner 106. At 204, the maintenance control unit 114 retrieves the maintenance operations for the aircraft 102, which is identified in the scanned data, from the maintenance data 118 stored in the memory 116. At 206 the maintenance control unit 114 then shows the maintenance operations, such as via one or more codes 112, and/or text, graphics, and/or the like, on the display 108.

Figure 6:
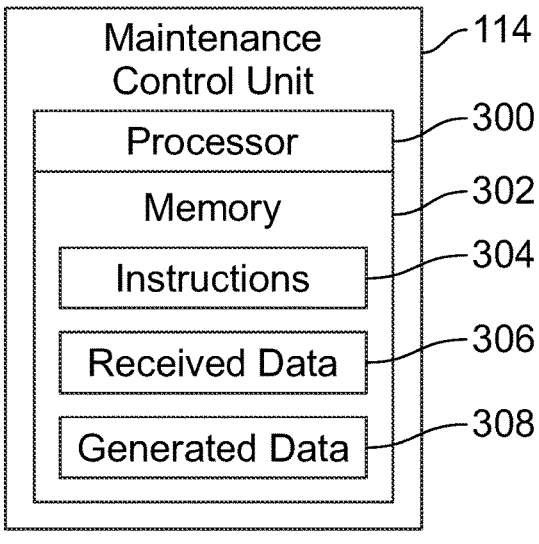
FIG. 6 illustrates a schematic block diagram of a maintenance control unit, according to an example of the present disclosure.

FIG. 6 illustrates a schematic block diagram of the maintenance control unit 114, according to an example of the present disclosure. In at least one example, the maintenance coordination control unit 114 includes at least one processor 300 in communication with a memory 302. The memory 302 stores instructions 304, received data 306, and generated data 308. The maintenance control unit 114 shown in FIG. 6 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the maintenance control unit 114 may be or include one or more processors that are configured to control operation, as described herein.

The maintenance control unit 114 is configured to execute a set of instructions that are stored in one or more data storage units or elements (such as one or more memories), in order to process data. For example, the maintenance control unit 114 may include or be coupled to one or more memories. The data storage units may also store data or other information as desired or needed. The data storage units may be in the form of an information source or a physical memory element within a processing machine.

The set of instructions may include various commands that instruct the maintenance control unit 114 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the maintenance control unit 114. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the maintenance control unit 114 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Referring to 1-6, examples of the subject disclosure provide systems and methods that allow large amounts of data to be quickly and efficiently analyzed by a computing device. For example, the maintenance control unit 114 can analyze scanned data from numerous codes 112 associated with numerous aircraft 102, and output maintenance tasks regarding the numerous aircraft 102 in real time. As such, large amounts of data, which may not be discernable by human beings, are being tracked and analyzed. The vast amounts of data are efficiently organized and/or analyzed by the maintenance control unit 114, as described herein. The maintenance control unit 114 analyzes the data in a relatively short time in order to quickly and efficiently determine maintenance operations for the aircraft 102. A human being would be incapable of efficiently analyzing such vast amounts of data in such a short time. As such, examples of the present disclosure provide increased and efficient functionality, and vastly superior performance in relation to a human being analyzing the vast amounts of data.

In at least one example, components of the system 100, such as the maintenance control unit 114, provide and/or enable a computer system to operate as a special computer system for coordinating maintenance operations. The maintenance control unit 114 improves upon standard computing devices by coordinating maintenance operations in an efficient and effective manner.

In at least one example, all or part of the systems and methods described herein may be or otherwise include an artificial intelligence (AI) or machine-learning system that can automatically perform the operations of the methods also described herein. For example, the maintenance control unit 114 can be an artificial intelligence or machine learning system. These types of systems may be trained from outside information and/or self-trained to repeatedly improve the accuracy with how data is analyzed to determine if and when maintenance operations are needed, schedule such operations, and optionally perform maintenance operations. Over time, these systems can improve by determining and coordinating maintenance operations with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the maintenance operations. The training minimizes conflicts and interference by performing an iterative training algorithm, in which the systems are retrained with an updated set of data (for example, data received in real time from numerous aircraft) and based on the feedback examined prior to the most recent training of the systems. This provides a robust analysis model that can better coordinate maintenance operations.

Figure 7:
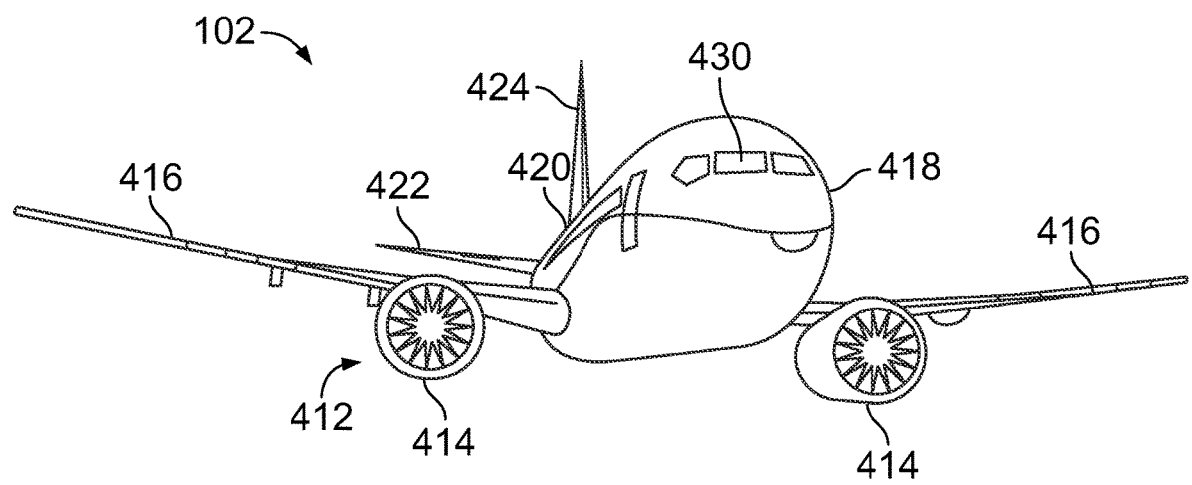
FIG. 7 illustrates a perspective front view of an aircraft, according to an example of the present disclosure.

FIG. 7 illustrates a perspective front view of an aircraft 102, according to an example of the present disclosure. The aircraft 102 includes a propulsion system 412 that includes engines 414, for example. Optionally, the propulsion system 412 may include more engines 414 than shown. The engines 414 are carried by wings 416 of the aircraft 102. In other examples, the engines 414 may be carried by a fuselage 418 and/or an empennage 420. The empennage 420 may also support horizontal stabilizers 422 and a vertical stabilizer 424. The fuselage 418 of the aircraft 102 defines an internal cabin 430, which includes a flight deck or cockpit, one or more work sections (for example, galleys, personnel carry-on baggage areas, and the like), one or more passenger sections (for example, first class, business class, and coach sections), one or more lavatories, and/or the like. FIG. 7 shows an example of an aircraft 102. It is to be understood that the aircraft 102 can be sized, shaped, and configured differently than shown in FIG. 7.

Figure 8:
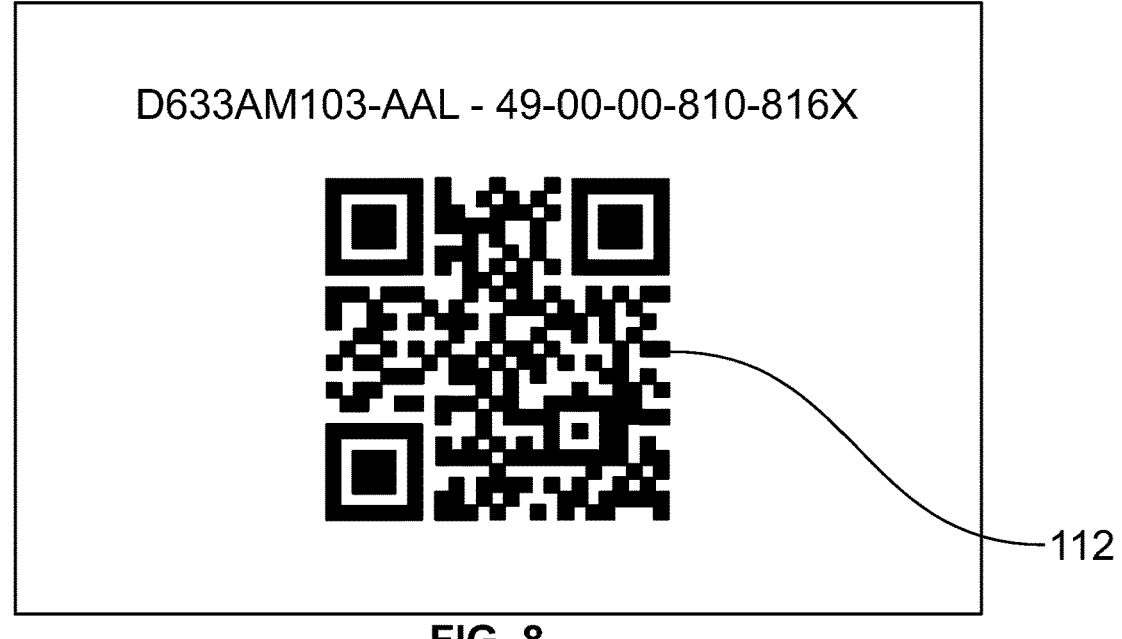
FIG. 8 illustrates a front view of a code, according to an example of the present disclosure.

FIG. 8 illustrates a front view of a code 112, according to an example of the present disclosure. The code 112 is a QR code, which includes information that specifically identifies an aircraft, as well as one or more maintenance operations to be performed in relation to the aircraft. The QR code 112 is configured to be scanned by the scanner 106, shown in FIG. 1.

Figure 9:
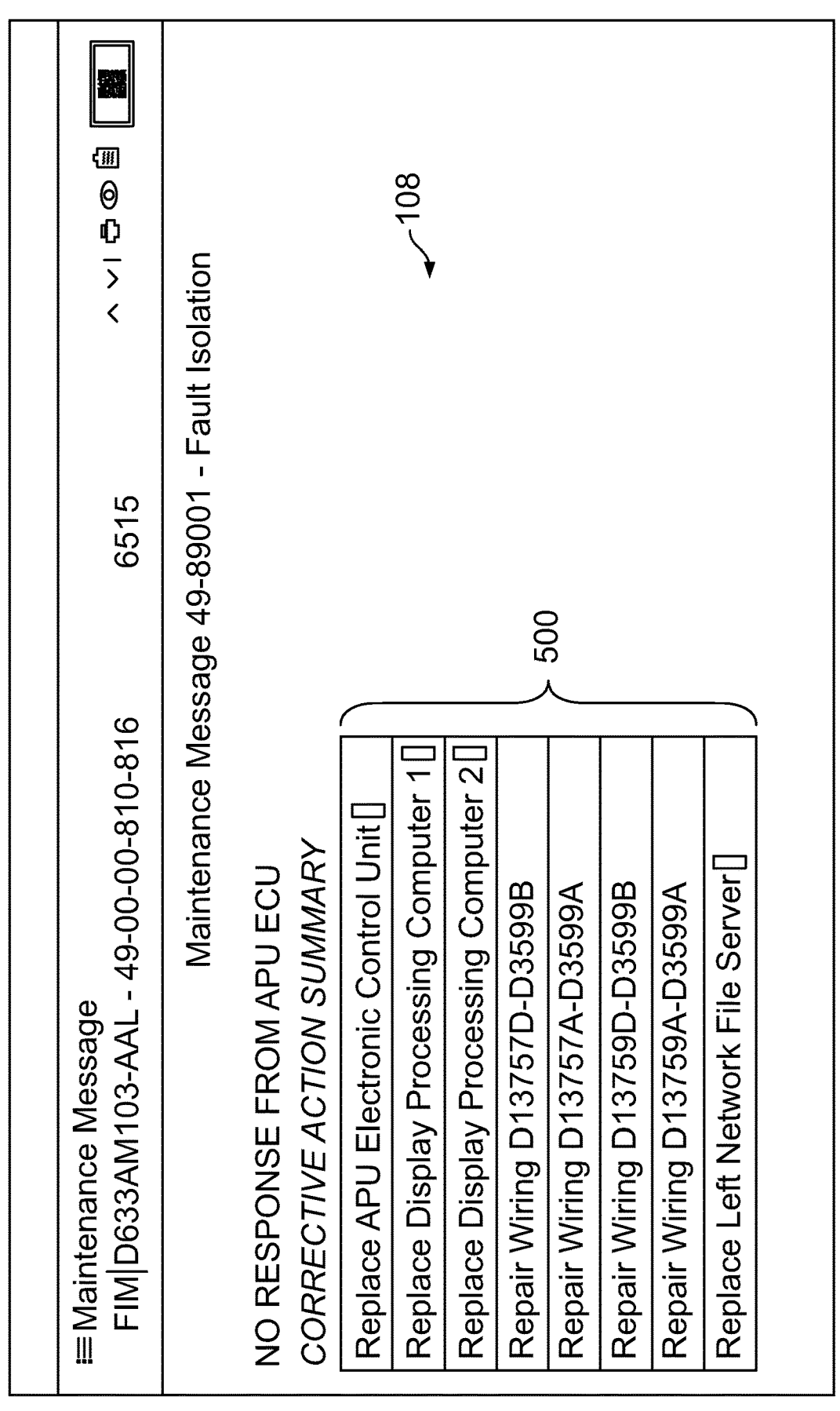
FIG. 9 illustrates a front view of a display showing a list of maintenance operations to be performed in relation to an aircraft, according to an example of the present disclosure.

FIG. 9 illustrates a front view of a display 108 showing a list 500 of maintenance operations to be performed in relation to an aircraft, according to an example of the present disclosure. Referring to FIGS. 1, 8, and 9, in response to the QR code 112 being scanned by the scanner 106, the maintenance control unit 114 retrieves maintenance operations for the aircraft 102, and can then show the list 500 of the maintenance operations on the display 108.

In at least one example, the maintenance control unit 114 can list numerous QR codes 112 for numerous maintenance operations associated one or more faults on the display 108. An individual can use the scanner 106 to scan such QR codes. In response to such QR codes being scanned, a list of maintenance operations can then be listed. Thus, instead of an individual using the input device 110 to select from among numerous maintenance operations, the individual can instead use the scanner 106 to scan QR codes associated with various maintenance operations, and then view the list of such maintenance operations in response to the QR codes being scanned.

Further, the disclosure comprises examples according to the following clauses:

Clause 1. A system comprising:
    a scanner configured to scan one or more codes associated with an aircraft;
    a user interface comprising a display; and
    a maintenance control unit configured to:
        receive scanned data regarding the one or more codes from the scanner, and
        show one or more maintenance operations for the aircraft on the display in response to receiving the scanned data.

Clause 2. The system of Clause 1, wherein the user interface further comprises the scanner.

Clause 3. The system of Clauses 1 or 2, wherein the one or more codes are one or more Quick Response (QR) codes.

Clause 4. The system of any of Clauses 1-3, wherein the maintenance control unit is further configured to automatically perform one or more maintenance operation in relation to the aircraft based on the scanned data.

Clause 5. The system of any of Clauses 1-4, wherein the one or more codes are printed on a document.

Clause 6. The system of any of Clauses 1-5, wherein the one or more codes are shown on the display or another electronic display.

Clause 7. The system of any of Clauses 1-6, wherein the one or more codes are disposed on a portion of the aircraft.

Clause 8. The system of any of Clauses 1-7, wherein the maintenance control unit is an artificial intelligence or machine learning system.

Clause 9. A method comprising:
    scanning, by a scanner, one or more codes associated with an aircraft;
    receiving, by a maintenance control unit, scanned data regarding the one or more codes from the scanner; and
    showing, by the maintenance control unit, one or more maintenance operations for the aircraft on a display of a user interface in response to said receiving.

Clause 10. The method of Clause 9, wherein the user interface further comprises the scanner.

Clause 11. The method of Clauses 9 or 10, wherein the one or more codes are one or more Quick Response (QR) codes.

Clause 12. The method of any of Clauses 9-11, further comprising automatically performing, by the maintenance control unit, one or more maintenance operation in relation to the aircraft based on the scanned data.

Clause 13. The method of any of Clauses 9-12, wherein the one or more codes are printed on a document.

Clause 14. The method of any of Clauses 9-13, wherein the one or more codes are shown on the display or another electronic display.

Clause 15. The method of any of Clauses 9-14, wherein the one or more codes are disposed on a portion of the aircraft.

Clause 16. The method of any of Clauses 9-15, wherein the maintenance control unit is an artificial intelligence or machine learning system.

Clause 17. A non-transitory computer-readable storage medium comprising executable instructions that, in response to execution, cause one or more control units comprising a processor, to perform operations comprising:
    receiving, by a maintenance control unit, scanned data regarding one or more codes associated with an aircraft from a scanner; and
    showing, by the maintenance control unit, one or more maintenance operations for the aircraft on a display of a user interface in response to said receiving.

Clause 18. The non-transitory computer-readable storage medium of Clause 17, wherein the one or more codes are one or more Quick Response (QR) codes.

Clause 19. The non-transitory computer-readable storage medium of Clauses 17 or 18, further comprising automatically performing one or more maintenance operation in relation to the aircraft based on the scanned data.

Clause 20. The non-transitory computer-readable storage medium of any of Clauses 17-19, wherein the one or more codes are one or more of printed on a document, shown on the display or another electronic display, or disposed on a portion of the aircraft.

As described herein, examples of the present disclosure provide systems and methods that improve coordination of maintenance operations for an aircraft. Further, examples of the present disclosure provide systems and methods a that reduce human error in relation to coordination of maintenance operations of an aircraft.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35

U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a scanner configured to scan one or more codes associated with an aircraft;
a user interface comprising a display; and
a maintenance control unit configured to:
    receive scanned data regarding the one or more codes from the scanner,
    show one or more maintenance operations for the aircraft on the display in response to receiving the scanned data, and
    automatically operate one or more vehicles or one or more robots to perform the one or more maintenance operations in relation to the aircraft based on the scanned data.

2. The system of claim 1, wherein the user interface further comprises the scanner.

3. The system of claim 1, wherein the one or more codes are one or more Quick Response (QR) codes.

4. The system of claim 1, wherein the one or more codes are printed on a document.

5. The system of claim 1, wherein the one or more codes are shown on the display or another electronic display.

6. The system of claim 1, wherein the one or more codes are disposed on a portion of the aircraft.

7. The system of claim 1, wherein the maintenance control unit is an artificial intelligence or machine learning system.

8. The system of claim 1, wherein the maintenance control unit is further configured to automatically determine necessary maintenance operations for the aircraft from the scanned data.

9. The system of claim 1, wherein the one or more maintenance operations comprise refueling the aircraft, and wherein the maintenance control unit is configured to automatically operate the one or more vehicles or the one or more robots to refuel the aircraft.

10. The system of claim 1, wherein the one or more maintenance operations comprise removing waste from one or more lavatories of the aircraft, and wherein the maintenance control unit is configured to operate the one or more vehicles or the one or more robots to remove the waste from the one or more lavatories of the aircraft.

11. A method comprising:
scanning, by a scanner, one or more codes associated with an aircraft;
receiving, by a maintenance control unit, scanned data regarding the one or more codes from the scanner;
showing, by the maintenance control unit, one or more maintenance operations for the aircraft on a display of a user interface in response to said receiving; and
automatically operating, by the maintenance control unit, one or more vehicles or one or more robots to perform the one or more maintenance operations in relation to the aircraft based on the scanned data.

12. The method of claim 11, wherein the user interface further comprises the scanner.

13. The method of claim 11, wherein the one or more codes are one or more Quick Response (QR) codes.

14. The method of claim 11, wherein the one or more codes are printed on a document.

15. The method of claim 11, wherein the one or more codes are shown on the display or another electronic display.

16. The method of claim 11, wherein the one or more codes are disposed on a portion of the aircraft.

17. The method of claim 11, wherein the maintenance control unit is an artificial intelligence or machine learning system.

18. A non-transitory computer-readable storage medium comprising executable instructions that, in response to execution, cause one or more control units comprising a processor, to perform operations comprising:
receiving scanned data regarding one or more codes associated with an aircraft from a scanner;
showing one or more maintenance operations for the aircraft on a display of a user interface in response to said receiving; and
automatically operating one or more vehicles or one or more robots to perform the one or more maintenance operations in relation to the aircraft based on the scanned data.

19. The non-transitory computer-readable storage medium of claim 18, wherein the one or more codes are one or more Quick Response (QR) codes.

20. The non-transitory computer-readable storage medium of claim 18, wherein the one or more codes are one or more of printed on a document, shown on the display or another electronic display, or disposed on a portion of the aircraft.

* * * * *